(12) United States Patent
Dillon

(10) Patent No.: US 7,861,795 B2
(45) Date of Patent: Jan. 4, 2011

(54) IMPLEMENT TRANSPORT

(76) Inventor: Peter Dillon, Box 968, Virden, MB (CA) R0M 2C0

( * ) Notice: Subject to any disclaimer, the term of this patent is extended or adjusted under 35 U.S.C. 154(b) by 0 days.

(21) Appl. No.: 12/404,592

(22) Filed: Mar. 16, 2009

(65) Prior Publication Data

US 2009/0229841 A1 Sep. 17, 2009

(51) Int. Cl.
*A01B 63/00* (2006.01)
(52) U.S. Cl. .................. 172/452; 172/311
(58) Field of Classification Search .......... 172/311, 172/452, 456, 467, 478
See application file for complete search history.

(56) References Cited

U.S. PATENT DOCUMENTS

| 3,539,016 | A | * | 11/1970 | Bauer et al. ............... 172/311 |
| 3,548,954 | A | * | 12/1970 | Lindemann .............. 172/311 |
| 3,654,999 | A | | 4/1972 | Fischer |
| 3,841,412 | A | * | 10/1974 | Sosalla ..................... 172/311 |
| 3,880,241 | A | * | 4/1975 | Vincent .................... 172/311 |
| 3,990,521 | A | * | 11/1976 | Ankenman et al. ........ 172/311 |
| 4,058,170 | A | * | 11/1977 | Ankenman et al. ........ 172/311 |
| 4,418,762 | A | * | 12/1983 | Page ........................ 172/311 |
| 4,425,971 | A | * | 1/1984 | Allen ....................... 172/311 |
| 4,821,809 | A | | 4/1989 | Summach et al. |
| 4,896,732 | A | * | 1/1990 | Stark ........................ 172/311 |
| 5,029,757 | A | * | 7/1991 | Bourgault et al. ......... 239/167 |
| 5,660,237 | A | * | 8/1997 | Boyko et al. ............. 172/311 |
| 5,950,926 | A | * | 9/1999 | Chahley et al. ........... 239/159 |
| 6,076,613 | A | | 6/2000 | Frasier |
| 6,374,923 | B1 | * | 4/2002 | Friggstad ................. 172/383 |
| 6,684,962 | B1 | | 2/2004 | Lewallen |
| 7,429,003 | B2 | * | 9/2008 | Thompson et al. ........ 239/167 |

* cited by examiner

*Primary Examiner*—Robert E Pezzuto
*Assistant Examiner*—Jamie L McGowan
(74) *Attorney, Agent, or Firm*—Edward J. Chalfie; Husch Blackwell LLP Welsh & Katz

(57) ABSTRACT

An implement apparatus includes a hitch frame, center frame section, and right and left wing sections pivotally attached to the center section. An actuator pivots the center frame section upward about the hitch frame axis at the rear of the hitch frame to raise the frame sections upward and rearward from a horizontal aligned operating position, where front ends of the frame sections are forward of the hitch frame axis, to a raised position where the frame sections are oriented vertically. Working members mounted to the frame sections forward of the hitch frame support the apparatus on the ground in the operating position, move upward off the ground in the raised position. Transport wheels rearward of the hitch frame axis are above the ground in the operating position, and move down to support the apparatus in the raised position, where wing sections can pivot rearward to the transport position.

24 Claims, 4 Drawing Sheets

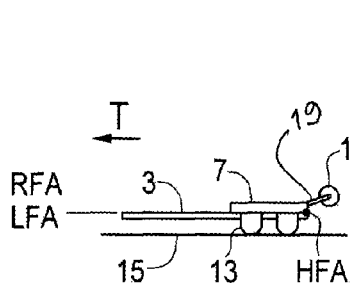
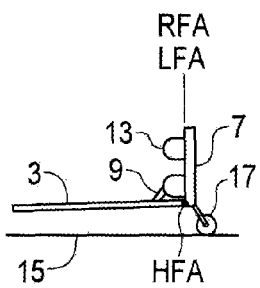
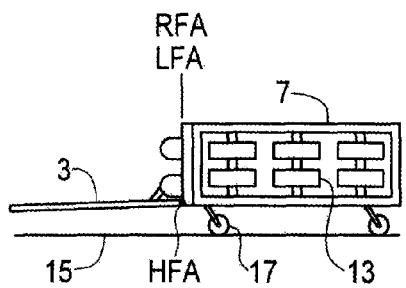
FIG. 7    FIG. 8    FIG. 9
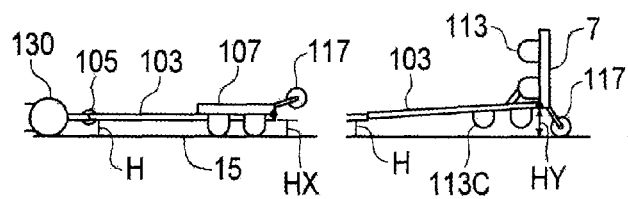
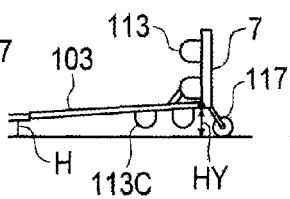
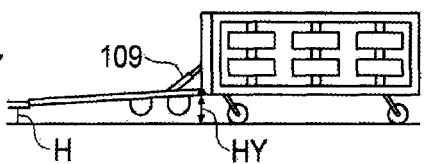
FIG. 10    FIG. 11    FIG. 12
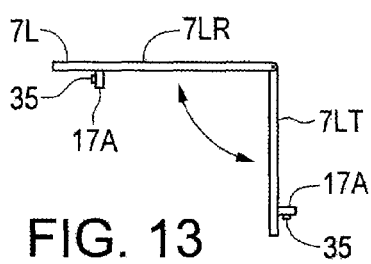
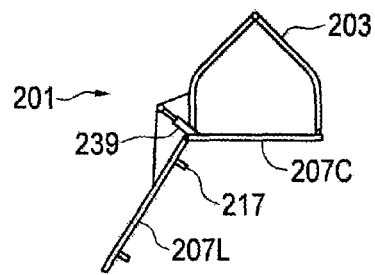
FIG. 13    FIG. 14
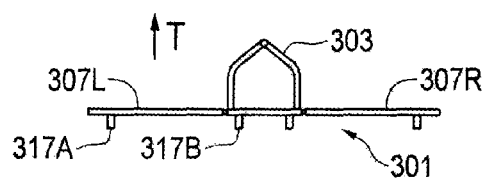
FIG. 15

IMPLEMENT TRANSPORT

This invention is in the field of agricultural implements and in particular a transport system for such implements.

BACKGROUND

Wide agricultural implements are popular in more open agricultural areas where fields are large. With an implement making a wide swath, fewer the passes are required than with a narrower implement, and generally the operation can be completed in less time. A significant issue with wider implement is that they must be converted into a narrower transport position in order to move along relatively narrow roads from one field to another.

Wide implements generally comprise laterally extending wings that fold for transport in a variety of different ways. U.S. Pat. No. 6,684,962 to Lewallen illustrates an implement where the wings fold upward about a number of pivot axes oriented parallel to the operating travel direction of the implement. In U.S. Pat. No. 3,654,999 to Fischer the implement wings pivot rearward about a vertical pivot axis.

In U.S. Pat. No. 4,821,809 to Summach the rear end of the whole width of the implement pivots upward and forward about a pivot axis oriented perpendicular to the operating travel direction at the front of the implement, and then the wings fold rearward about vertical axes. U.S. Pat. No. 6,076,613 to Frasier illustrates an implement where the wings fold forward about vertical pivot axes.

As these implement grow wider it becomes more problematic to design an implement with wings that will fold to a width that allows for efficient transport. In addition, when folding the wings upward as in the machine illustrated in U.S. Pat. No. 6,684,962 to Lewallen results in a transport position that has a significant height, and which may exceed limits on some roads and restrict travel.

SUMMARY OF THE INVENTION

It is an object of the present invention to provide an implement transport apparatus that overcomes problems in the prior art.

In a first embodiment the present invention provides an implement apparatus adapted for attachment to a towing vehicle for movement in an operating travel direction. The apparatus comprises a hitch frame with a hitch at a front end thereof adapted for attachment to the towing vehicle, and a center frame section pivotally attached to a rear portion of the hitch frame about a substantially horizontal hitch frame axis oriented substantially perpendicular to the operating travel direction. A right wing frame section is pivotally attached to a right end of the center frame section about a right frame axis, and a left wing frame section is pivotally attached to a left end of the center frame section about a left frame axis oriented substantially parallel to the right frame axis. An actuator is operative to pivot the center frame section upward about the hitch frame axis to raise the center, right wing, and left wing frame sections from an operating position, where the frame sections are substantially aligned laterally and are oriented substantially horizontally with front ends thereof forward of the hitch frame axis and where the right and left frame axes are substantially horizontal and aligned with the operating travel direction, to a raised position where the frame sections are oriented substantially vertically with the front ends thereof above the hitch frame axis and where the right and left frame axes are substantially vertical. A plurality of working members are mounted to the frame sections forward of the hitch frame axis such that the working members contact the ground when the frame sections are in the operating position to support the hitch frame and frame sections for movement along the ground when in the operating position, and such that the working members move upward off the ground as the frame sections move from the operating position to the raised position. A plurality of transport wheels are mounted to rear portions of the frame sections rearward of the hitch frame axis such that the transport wheels are above the ground when the frame sections are in the operating position, and such that the transport wheels move down into contact with the ground as the frame sections move from the operating position to the raised position to support the hitch frame and frame sections in the raised position. With the frame sections in the raised position the right and left wing frame sections can pivot rearward on the transport wheels about the corresponding right and left frame axes to a transport position where the right and left wing frame sections are substantially parallel and extend rearward from the corresponding right and left frame axes.

In a second embodiment the present invention provides a method of moving an implement from an operating position to a transport position. The method comprises providing a hitch frame with a hitch at a front end thereof and attaching the hitch to a towing vehicle; pivotally attaching a center frame section to a rear portion of the hitch frame about a substantially horizontal hitch frame axis oriented substantially perpendicular to the operating travel direction; pivotally attaching a right wing frame section to a right end of the center frame section about a right frame axis; pivotally attaching a left wing frame section to a left end of the center frame section about a left frame axis oriented substantially parallel to the right frame axis; positioning the center, right wing, and left wing frame sections in an operating position where the frame sections are substantially aligned laterally and oriented substantially horizontally with front ends thereof forward of the hitch frame axis and where the right and left frame axes are substantially horizontal and aligned with the operating travel direction; supporting the hitch frame and frame sections for movement along the ground in the operating position on a plurality of working members that are mounted to the frame sections forward of the hitch frame axis and that contact the ground when the frame sections are in the operating position; with an actuator, pivoting the center frame section upward about the hitch frame axis to raise the center, right wing, and left wing frame sections to a raised position where the frame sections are oriented substantially vertically with the front ends thereof above the hitch frame axis, and where the right and left frame axes are substantially vertical; wherein the working members move upward off the ground as the frame sections move from the operating position to the raised position; providing a plurality of transport wheels mounted to rear portions of the frame sections rearward of the hitch frame axis such that the transport wheels are above the ground when the frame sections are in the operating position, and such that the transport wheels move down into contact with the ground as the frame sections move from the operating position to the raised position, and supporting the hitch frame and frame sections on the transport wheels in the raised position; with the frame sections in the raised position, pivoting the right and left wing frame sections rearward about the corresponding right and left frame axes to a transport position where the right and left wing frame sections are substantially parallel and extend rearward from the corresponding right and left frame axes.

Thus the implement apparatus and method of the present invention provide a convenient and economical transport system for wide implements where the wing frames on which the working members, such as packers, seeding assemblies, land rollers, and the like, are located ahead of a lateral pivot axis such that the wing frames move upward and rearward, and then fold back behind the hitch to the transport position. Thus in the transport position the working members are located toward the outside of the parallel rear trailing wing frames, instead of between the wing frames as in the prior art. Thus the working members are not subject to touching each other during transport, reducing the risk of damage.

The implement when in the transport position has a low profile and can be maneuvered into a storage shed through a common door that might for example be 14 feet high.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 7 is a schematic side view of the embodiment of FIG. 1 in the operating position;

FIG. 8 is a schematic side view of the embodiment of FIG. 1 in the raised position;

FIG. 9 is a schematic side view of the embodiment of FIG. 1 in the transport position;

FIG. 10 is a schematic side view of the embodiment of FIG. 4 in the operating position;

FIG. 11 is a schematic side view of the embodiment of FIG. 4 in the raised position;

FIG. 12 is a schematic side view of the embodiment of FIG. 4 in the transport position;

FIG. 13 is a schematic top view showing the left wing frame section of the embodiment of FIG. 1 in the raised and transport positions, and a motor to rotate the outer transport wheel;

FIG. 14 is a schematic top view of an alternate embodiment of the implement apparatus of the present invention in an intermediate position between the wing filly forward raised position and the wing fully rearward transport position;

FIG. 15 is a schematic top view of an alternate embodiment of the implement apparatus in the raised position where inner transport wheels are mounted on the hitch frame;

DETAILED DESCRIPTION OF THE ILLUSTRATED EMBODIMENTS

FIGS. 1-3 and 7-9 schematically illustrate an embodiment of an implement apparatus 1 of the present invention. The apparatus 1 is adapted for attachment to a towing vehicle for movement in an operating travel direction T. The apparatus 1 comprises a hitch frame 3 with a hitch 5 at a front end thereof adapted for attachment to the towing vehicle. A center frame section 7C is pivotally attached to a rear portion of the hitch frame 3 about a substantially horizontal hitch frame axis HFA oriented substantially perpendicular to the operating travel direction T. A right wing frame section 7R is pivotally attached to a right end of the center frame section 7C about a right frame axis RFA, and a left wing frame section 7L is pivotally attached to a left end of the center frame section 7C about a left frame axis LFA oriented substantially parallel to the right frame axis RFA.

Figure 1:
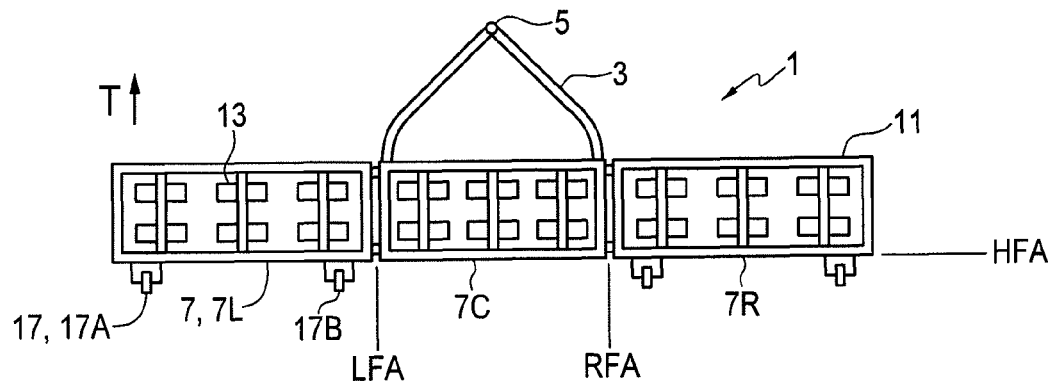
FIG. 1 is a schematic top view of an embodiment of an implement apparatus of the present invention in the operating position.

A pair of lift actuators 9 is operative to pivot the center frame section 7C upward about the hitch frame axis HFA to raise the center, right wing, and left wing frame sections 7 from the operating position illustrated in FIGS. 1 and 7. In the operating position the frame sections 7 are substantially aligned laterally as seen in FIG. 1 and are oriented substantially horizontally with front ends 11 thereof forward of the hitch frame axis HFA as seen in FIG. 7. The right and left frame axes RFA, LFA are substantially horizontal and aligned with the operating travel direction T as illustrated. The actuators 9 pivot the frame sections 7 to a raised position illustrated in FIGS. 2 and 8 where the frame sections 7 are oriented substantially vertically with the front ends 11 thereof above the hitch frame axis HFA and where the right and left frame axes RFA, LFA are substantially vertical.

Working members 13 are mounted to the frame sections 7 forward of the hitch frame axis HFA such that the working members 13 contact the ground 15 when the frame sections are in the operating position of FIGS. 1 and 7 to support the hitch frame 3 and frame sections 7 for movement along the ground in the operating position. The working members 13 can be any desired device which might be used for field operations in agriculture, such as packer wheels, harrows, gauge wheels, furrow opener assemblies, land rollers, or the like. With some implements, such as agricultural field sprayers there are no ground contacting elements suitable to support the apparatus 1, and the working member in that case would simply be a suitable number of support wheels configured as required to support the frames 3 and 7 in the operating position. With any kind of working members 13, such as conventional tooth type harrows, it may also be desirable that some support wheels be provided as working members in combination with the harrows to support the frames 3 and 7.

Figure 2:
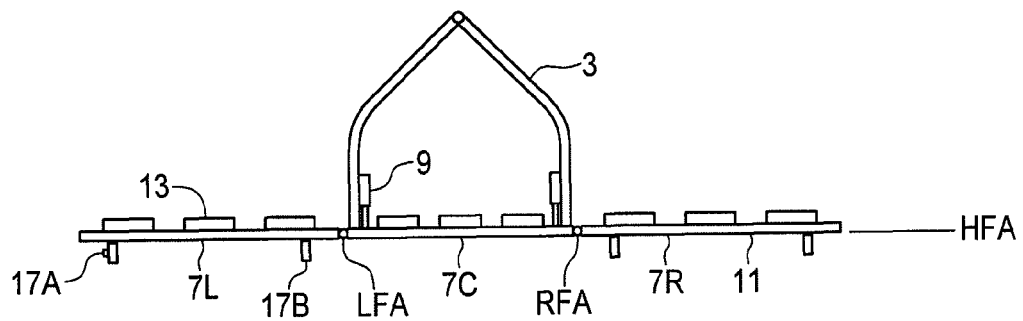
FIG. 2 is a schematic top view of the embodiment of FIG. 1 in the raised position.

As can be seen in FIGS. 2 and 8, the working members 13 move upward off the ground 15 as the frame sections 7 move from the operating position of FIGS. 1 and 7 to the raised position of FIGS. 2 and 8.

Transport wheels 17 are mounted to rear portions of the frame sections 7 rearward of the hitch frame axis HFA such that the transport wheels 17 are above the ground 15 when the frame sections 7 are in the operating position, as seen in FIG. 7. As the transport wheels 17 are mounted on arms 19, the transport wheels 17 move down into contact with the ground 15 as the frame sections 7, and the arms 19 fixed thereto, pivot from the operating position of FIG. 7 to the raised position of FIG. 8. Thus the transport wheels 17 automatically move down to support the hitch frame 3 and frame sections 7 in the raised position as the working members 13 move up off the ground.

Figure 3:
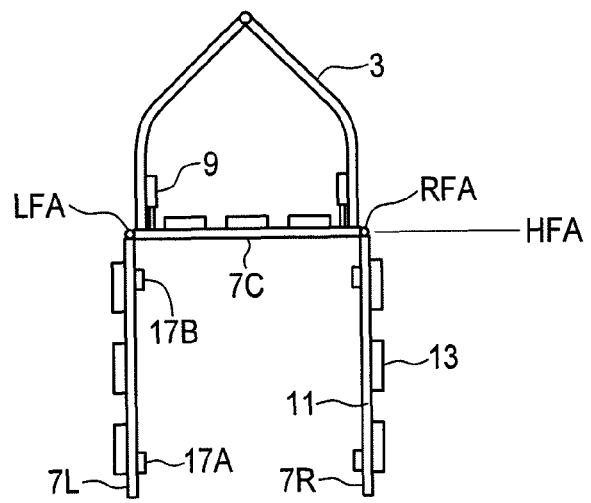
FIG. 3 is a schematic top view of the embodiment of FIG. 1 in the transport position.
Figure 4:
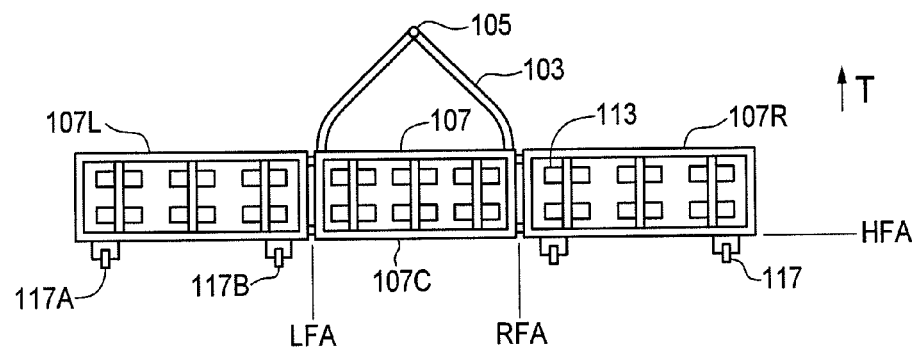
FIG. 4 is a schematic top view of an alternate embodiment of the implement apparatus of the present invention in the operating position.
Figure 5:
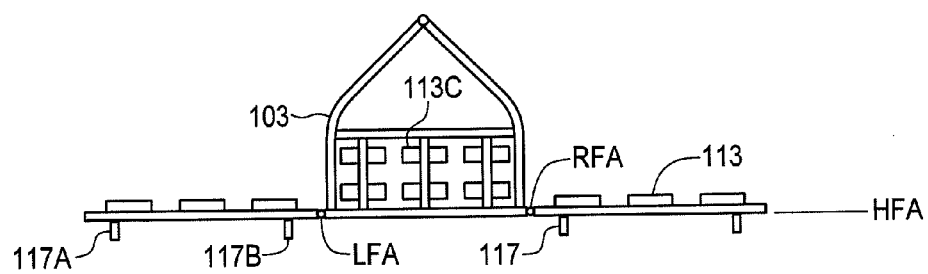
FIG. 5 is a schematic top view of the embodiment of FIG. 4 in the raised position.
Figure 6:
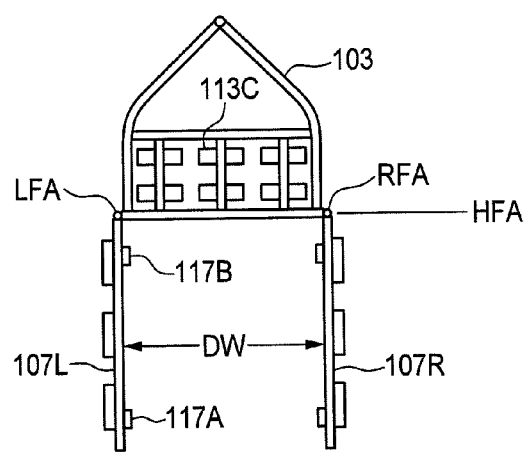
FIG. 6 is a schematic top view of the embodiment of FIG. 4 in the transport position.

With the frame sections in the raised position of FIGS. 2 and 8, the right and left wing frame sections 7R, 7L can pivot rearward about the corresponding right and left frame axes RFA, LFA to the transport position of FIGS. 3 and 9 where the right and left wing frame sections 7R, 7L are substantially parallel and extend rearward from the corresponding right and left frame axes RFA, LFA. Thus in the transport position the working members 13 are located toward the outside of the wing frames 7R, 7L, instead of between the wing frames as in the prior art. The distance DW between the wings can thus be reduced if required to reduce transport width.

FIGS. 4-6 and 10-12 schematically illustrate an alternate embodiment of an implement apparatus 101 of the present invention that is similar to the apparatus 1 except that the center working members 113C are mounted to the hitch frame 103 rather than to the center frame section 107C. With some types of implements or working members it may be desirable, for weight and balance considerations for example, to mount the central working members 113C to the hitch frame 103 so that they do not have to be raised vertically during transport.

In the apparatus 101 the right and left working members 113R, 113L are mounted as in the apparatus 1 to the right and left wing frame sections 107R, 107L. An actuator 109 is operative to pivot the center frame section 107C up to move the apparatus 101 to the raised position of FIGS. 5 and 11. The hitch 105 on the hitch frame 103 is connected to a towing vehicle 130 such that the hitch is at a height H above the ground 15. The transport wheels 117 are configured such that as the transport wheels 117 move down into the raised position of FIGS. 5 and 11, the rear portion of the hitch frame 103 moves upward and the center working members 113C move up off the ground.

As seen in FIGS. 10 and 11, as the frame sections 107 pivot up to the raised position, the hitch 105 attached to the towing vehicle stays at the same height H, but the rear end of the hitch frame 103 moves up from height HX to height HY, a distance configured to be also sufficient to raise the center working members 113C up off the ground so same can be transported. The right and left wings 107R, 107L can then, as in the prior apparatus 1, pivot rearward about the right and left frame axes RFA, LFA to the transport position of FIGS. 6 and 12.

Both apparatuses 1, 101 are illustrated with right and left outer transport wheels 17A 117A mounted to outer portions of corresponding right and left wing frame sections 7R, 7L, 107R, 107L, and right and left inner transport wheels 17B, 117B mounted to inner portions of the corresponding right and left wing frame sections. Both the inner and outer transport wheels are caster wheels operative to pivot about vertical caster axes such that same may turn with respect to the frame sections 7, 107 from the orientation in the raised position of FIGS. 2 and 5 to the orientation in the transport position of FIGS. 3 and 6.

Once the apparatus 1, 101 is in the transport position, caster securing mechanisms can be operated to secure the outer transport wheels 17A, 117A in a fixed position with respect to the caster axes thereof so that the wing frame sections will stay aligned for travel along roads or the like. Such caster wheels and caster securing mechanisms are well known in the art.

FIG. 13 schematically illustrates the left wing frame section moving from the raised position 7LR to the transport position 7LT. The outer transport wheel 17A is powered by a hydraulic or electric motor 35 that is operated to rotate the outer transport wheel 17A. With the wing frame section 7L in the raised position 7LR, the castering outer transport wheel 17A is secured in the position of FIG. 2, with the rotational axis thereof parallel to the wing frame section 7L. Rotating the wheel 17 will then move the wing frame section 7L rearward to the transport position 7LT. The caster securing mechanism is then released and the outer transport wheel 17 is turned on its caster axis to the position of FIG. 3 where the rotational axis thereof is perpendicular to the wing frame section 7L. The operation is reversed to move the apparatus from the transport position back to the raised position.

FIG. 14 schematically illustrates an embodiment of the implement apparatus 201 which includes a hitch frame 203 and a transport actuator 239 operative to move the left wing frame section 207L forward from the rearward oriented direction shown to the raised position aligned with the center frame section 207C. In order to facilitate this movement, the securing mechanisms on the transport wheels 217 are released and the towing vehicle is turned to the left to position the left wing frame section 207L at some rearward angle less than perpendicular to the center frame section 207C, and then the transport actuator 239 can move the left wing frame section 207L forward as required. Once the left wing frame section 207L is in the raised position, similar maneuvering and operation can be used on the right wing frame section.

FIG. 15 is a schematic top view of an alternate apparatus 301 comprising right and left outer transport caster wheels 317A mounted to outer portions of corresponding right and left wing frame sections about vertical caster axes, and right and left inner transport wheels 317B mounted to corresponding right and left portions of the hitch frame 303 instead of to the wing frame sections 307R, 307L. The inner transport wheels 317B are fixed in an orientation rolling in the operating travel direction T. Caster securing mechanisms secure the outer transport caster wheels 317A in a fixed position with respect to caster axes thereof.

Figure 16:
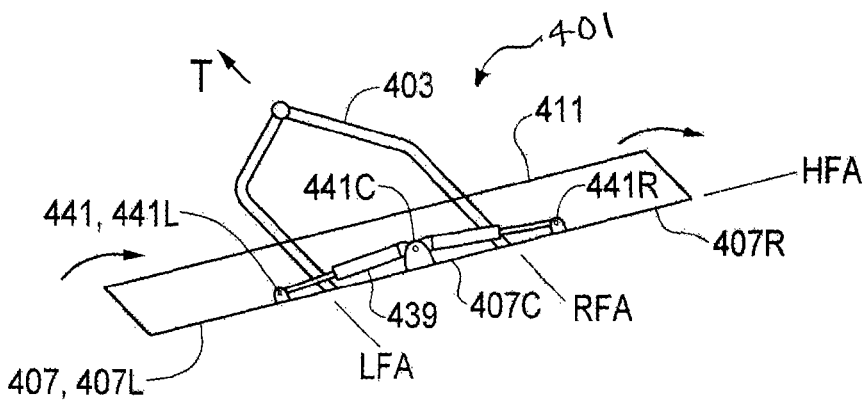
FIG. 16 is a schematic rear perspective view of an alternate embodiment of the implement apparatus of the present invention in the operating position.
Figure 17:
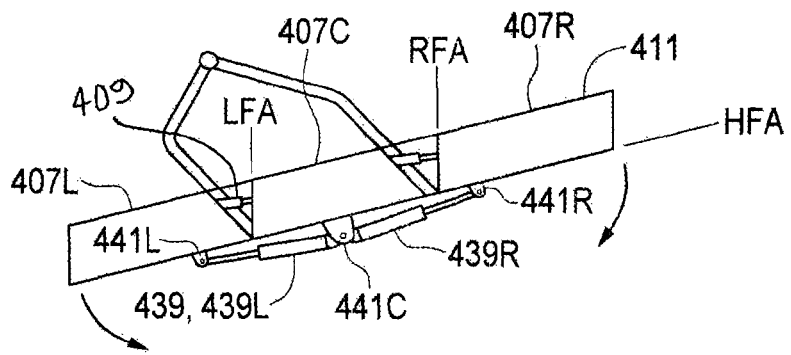
FIG. 17 is a schematic rear perspective view of the embodiment of FIG. 16 where the apparatus is in the raised position.
Figure 18:
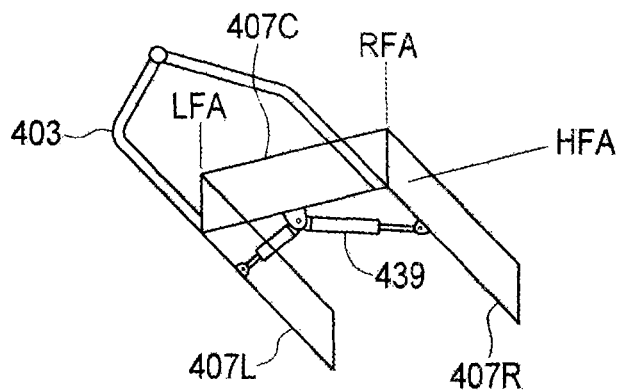
FIG. 18 is a schematic rear perspective view of the embodiment of FIG. 16 where the apparatus is in the transport position.

FIGS. 16-18 schematically illustrate operation of an alternate embodiment of the implement apparatus 401 with a hitch frame 403. A pair of lift actuators 409 is operative to pivot the center frame section 407C upward about the hitch frame axis HFA to raise the center, right wing, and left wing frame sections 407C, 407R, 407L from the operating position illustrated in FIG. 16 where the frame sections 407 are substantially aligned laterally and are oriented substantially horizontally with front ends 411 thereof forward of the hitch frame axis HFA, and where the right and left frame axes RFA, LFA are substantially horizontal and aligned with the operating travel direction T as illustrated.

Working members and transport wheels are mounted on the apparatus 401 substantially as described above, and are not shown in order to allow clear illustration of the movement of the frame sections and operation of actuators.

The actuators 409 pivot the frame sections 407 to a raised position illustrated in FIG. 17 where the frame sections 407 are oriented substantially vertically with the front ends 411 thereof above the hitch frame axis HFA and where the right and left frame axes RFA, LFA are substantially vertical.

The apparatus 401 also includes transport hydraulic cylinders 439R, 439L mounted at inner ends thereof to a center anchor 441C that extends outward from a rear portion of the center frame section 407C. The outer ends of the transport hydraulic cylinders 439 are connected to corresponding right and left wing anchors 441R, 441L. The center and wing anchors extend upward when the frame sections 407 are in the operating position of FIG. 16, and so when the frame sections move up to the raised position of FIG. 17, the anchors 441 end up extending rearward in the raised position.

In the operating position of FIG. 16 and the raised position of FIG. 17, the transport hydraulic cylinders 439 are extended as illustrated. Thus when the transport hydraulic cylinders 439 are retracted, the wing frame sections 407R, 407L are pivoted about the right and left frame axes RFA, LFA, and are drawn into the transport position of FIG. 18. Extending the transport hydraulic cylinders 239 will pivot the wing frame sections 407R, 407L back to the raised position of FIG. 17.

With the frame sections in the raised position of FIG. 17 the right and left wing frame sections 407R, 407L can pivot rearward about the corresponding right and left frame axes RFA, LFA to the transport position of FIGS. 3 and 9 where the right and left wing frame sections 7R, 7L are substantially parallel and extend rearward from the corresponding right and left frame axes RFA, LFA.

Thus in the apparatus 401 the transport actuators are operative to move the wing frame sections into and out of transport, in combination with transport wheels as described above.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An implement apparatus adapted for attachment to a towing vehicle for movement in an operating travel direction, the apparatus comprising:
   a hitch frame with a hitch at a front end thereof adapted for attachment to the towing vehicle;
   a center frame section pivotally attached at a rear portion thereof to a rear portion of the hitch frame about a substantially horizontal hitch frame axis oriented substantially perpendicular to the operating travel direction;
   a right wing frame section pivotally attached to a right end of the center frame section about a right frame axis;
   a left wing frame section pivotally attached to a left end of the center frame section about a left frame axis oriented substantially parallel to the right frame axis;
   an actuator operative to pivot the center frame section upward about the hitch frame axis to raise the center, right wing, and left wing frame sections from an operating position, where the frame sections are substantially aligned laterally and are oriented substantially horizontally with front ends thereof forward of the hitch frame axis and where the right and left frame axes are substantially horizontal and aligned with the operating travel direction, to a raised position where the frame sections are oriented substantially vertically with the front ends thereof above the hitch frame axis and where the right and left frame axes are substantially vertical;
   a plurality of working members mounted to the frame sections such that all working members are located forward of the hitch frame axis and such that the working members contact the ground when the frame sections are in the operating position to support the hitch frame and frame sections for movement along the ground when in the operating position, and such that the working members move upward off the ground as the frame sections move from the operating position to the raised position;
   a plurality of transport wheels mounted to rear portions of the frame sections rearward of the hitch frame axis such that the transport wheels are above the ground when the frame sections are in the operating position, and such that the transport wheels move down into contact with the ground as the frame sections move from the operating position to the raised position to support the hitch frame and frame sections in the raised position;
   wherein, with the frame sections in the raised position the right and left wing frame sections can pivot rearward on the transport wheels about the corresponding right and left frame axes to a transport position where the right and left wing frame sections are substantially parallel and extend rearward from the corresponding right and left frame axes.

2. The apparatus of claim 1 wherein the working members are selected from a group consisting of a packer wheel, a harrow, a gauge wheel, a furrow opener assembly, a land roller, and a support wheel.

3. The apparatus of claim 1 wherein center working members are mounted to the hitch frame, and the center frame is substantially free of working members.

4. The apparatus of claim 3 wherein the transport wheels are configured such that as the transport wheels move down into the raised position the rear portion of the hitch frame moves upward and the center working members move up off the ground.

5. The apparatus of claim 1 comprising right and left outer transport wheels mounted to outer portions of corresponding right and left wing frame sections, and right and left inner transport wheels mounted to inner portions of corresponding right and left wing frame sections.

6. The apparatus of claim 5 wherein the inner transport wheels are caster wheels operative to pivot about substantially vertical caster axes.

7. The apparatus of claim 6 wherein the outer transport wheels are caster wheels operative to pivot about substantially vertical caster axes.

8. The apparatus of claim 7 comprising caster securing mechanisms operative to secure the outer transport wheels in a fixed position with respect to the caster axes thereof.

9. The apparatus of claim 1 comprising right and left outer transport caster wheels mounted to outer portions of corresponding right and left wing frame sections about substantially vertical caster axes, and right and left inner transport wheels mounted to corresponding right and left portions of the hitch frame in a substantially fixed orientation rolling in the operating travel direction.

10. The apparatus of claim 9 comprising caster securing mechanisms operative to secure the outer transport wheels in a fixed position with respect to caster axes thereof.

11. The apparatus of claim 5 wherein the outer transport wheels are powered such that the outer transport wheels can be rotated to move the wing frame sections.

12. The apparatus of claim 1 comprising a transport actuator operative to move the wing frame sections forward from a rearward oriented direction to the raised position.

13. A method of moving an implement from an operating position to a transport position, the method comprising:
   providing a hitch frame with a hitch at a front end thereof and attaching the hitch to a towing vehicle;
   pivotally attaching a rear portion of a center frame section to a rear portion of the hitch frame about a substantially horizontal hitch frame axis oriented substantially perpendicular to the operating travel direction;
   pivotally attaching a right wing frame section to a right end of the center frame section about a right frame axis;
   pivotally attaching a left wing frame section to a left end of the center frame section about a left frame axis oriented substantially parallel to the right frame axis;
   positioning the center, right wing, and left wing frame sections in an operating position where the frame sections are substantially aligned laterally and oriented substantially horizontally with front ends thereof forward of the hitch frame axis and where the right and left frame axes are substantially horizontal and aligned with the operating travel direction;

supporting the hitch frame and frame sections for movement along the ground in the operating position on a plurality of working members, wherein all working members are mounted to the frame sections forward of the hitch frame axis and contact the ground when the frame sections are in the operating position;

with an actuator, pivoting the center frame section upward about the hitch frame axis to raise the center, right wing, and left wing frame sections to a raised position where the frame sections are oriented substantially vertically with the front ends thereof above the hitch frame axis, and where the right and left frame axes are substantially vertical;

wherein the working members move upward off the ground as the frame sections move from the operating position to the raised position;

providing a plurality of transport wheels mounted to rear portions of the frame sections rearward of the hitch frame axis such that the transport wheels are above the ground when the frame sections are in the operating position, and such that the transport wheels move down into contact with the ground as the frame sections move from the operating position to the raised position, and supporting the hitch frame and frame sections on the transport wheels in the raised position;

with the frame sections in the raised position, pivoting the right and left wing frame sections rearward on the transport wheels about the corresponding right and left frame axes to a transport position where the right and left wing frame sections are substantially parallel and extend rearward from the corresponding right and left frame axes.

14. The method of claim 13 wherein the working members are selected from a group consisting of a packer wheel, a harrow, a gauge wheel, a furrow opener assembly, and a support wheel.

15. The method of claim 13 wherein center working members are mounted to the hitch frame, and the center frame is substantially free of working members.

16. The method of claim 15 wherein the transport wheels are configured such that as the transport wheels move down into the raised position the rear portion of the hitch frame moves upward and the center working members move up off the ground.

17. The method of claim 13 comprising mounting right and left outer transport wheels to outer portions of corresponding right and left wing frame sections, and mounting right and left inner transport wheels to inner portions of corresponding right and left wing frame sections.

18. The method of claim 17 wherein the inner transport wheels are caster wheels operative to pivot about substantially vertical caster axes.

19. The method of claim 18 wherein the outer transport wheels are caster wheels operative to pivot about substantially vertical caster axes.

20. The method of claim 19 comprising caster securing mechanisms operative to secure the outer transport wheels in a fixed position with respect to the caster axes thereof.

21. The method of claim 13 comprising right and left outer transport wheels mounted to outer portions of corresponding right and left wing frame sections about substantially vertical caster axes, and right and left inner transport wheels mounted to corresponding right and left portions of the hitch frame.

22. The apparatus of claim 21 comprising caster securing mechanisms operative to secure the outer transport wheels in a fixed position with respect to the caster axes thereof.

23. The method of claim 17 comprising rotating the outer transport wheels to move the wing frame sections.

24. The method of claim 13 comprising operating a transport actuator to move the wing frame sections forward from a rearward oriented direction to the raised position.

* * * * *